(12) United States Patent
Moe et al.

(10) Patent No.: US 8,354,625 B2
(45) Date of Patent: Jan. 15, 2013

(54) APPARATUSES FOR AND METHODS OF FORGE WELDING ELONGATED ARTICLES WITH ELECTRODES AND AN INDUCTION COIL

(75) Inventors: Per Thomas Moe, Drammen (NO); Bjørn Halmrast, Røkland (NO); Kjell Magne Rabben, Sandnes (NO)

(73) Assignee: AMR Engineering AS, Drammen (NO)

( * ) Notice: Subject to any disclaimer, the term of this patent is extended or adjusted under 35 U.S.C. 154(b) by 459 days.

(21) Appl. No.: 12/741,971

(22) PCT Filed: Nov. 10, 2008

(86) PCT No.: PCT/NO2008/000400
§ 371 (c)(1),
(2), (4) Date: May 7, 2010

(87) PCT Pub. No.: WO2009/061212
PCT Pub. Date: May 14, 2009

(65) Prior Publication Data
US 2010/0264131 A1   Oct. 21, 2010

(30) Foreign Application Priority Data
Nov. 9, 2007   (NO) .................................. 20075747

(51) Int. Cl.
*H05B 6/10* (2006.01)
(52) U.S. Cl. ........................................ 219/635; 219/637
(58) Field of Classification Search ................... 219/635, 219/637
See application file for complete search history.

(56) References Cited

U.S. PATENT DOCUMENTS

| | | | | |
|---|---|---|---|---|
| 4,669,650 A * | 6/1987 | Moe | ............................. | 228/219 |
| 4,736,084 A | 4/1988 | Moe | | |
| 5,571,437 A * | 11/1996 | Rudd | ............................ | 219/607 |
| 6,083,329 A | 7/2000 | Tsuchiya et al. | | |
| 7,181,821 B2 * | 2/2007 | Anderson et al. | ............... | 29/507 |
| 7,348,523 B2 * | 3/2008 | Slack et al. | ................... | 219/617 |
| 2005/0092715 A1 | 5/2005 | Alford et al. | | |

FOREIGN PATENT DOCUMENTS

| | | |
|---|---|---|
| JP | 2000 094155 | 4/2000 |
| WO | WO 99/12694 | 3/1999 |
| WO | WO 03/055635 | 7/2003 |
| WO | WO 2004/108341 | 12/2004 |

OTHER PUBLICATIONS

Norwegian Search Report corresponding to Norway 20075747, mailing date Apr. 4, 2008, 1 page.
International Search Report corresponding to PCT/NO2008/000400, mailing date Mar. 3, 2009, 2 pages.

* cited by examiner

*Primary Examiner* — Trung Q Dang
(74) *Attorney, Agent, or Firm* — Myers Bigel Sibley & Sajovec

(57) ABSTRACT

The present application relates to an apparatus for and a method of forge welding elongate articles (1, 2), such as tubes, together. In addition to electrode (12, 13) assemblies (9) for heating the article (1, 2) ends with high frequency resistive heating, the apparatus includes a coil (3) for induction heating the articles (1, 2) before or after welding, as well as means for cooling the welding seam.

4 Claims, 6 Drawing Sheets

APPARATUSES FOR AND METHODS OF FORGE WELDING ELONGATED ARTICLES WITH ELECTRODES AND AN INDUCTION COIL

RELATED APPLICATIONS

The present application is a 35 U.S.C. §371 national phase application of PCT International Application No. PCT/NO2008/000400, filed Nov. 10, 2008, which claims priority from Norwegian Patent Application No. 20075747, filed Nov. 9, 2007, the disclosures of which are hereby incorporated herein by reference in their entireties. The above PCT International Application was published in the English language and has International Publication No. WO 2009/061212 A1.

FIELD OF THE INVENTION

The present invention relates to welding articles in general and in particular the welding of solid and hollow sections such as oil field tubes and water pipe lines.

TECHNICAL BACKGROUND

The present invention relates to a method for forge or enhanced diffusion welding of two or more metal parts, wherein at least one joint is established between opposed bounding surfaces on the parts to be joined. One such method denoted Shielded Active Gas Forge Welding (SAG-FW) known from, and to a large extent defined by, U.S. Pat. Nos. 4,669,650 and 4,736,084 includes the following features:

1. The welding process consists of four main stages wherein the metal parts are:
   a. heated electromagnetically to high local temperatures,
   b. brought rapidly into close contact,
   c. forged together until a metallic bound is established, and
   d. cooled by convection, radiation and conduction
2. The metal parts have been carefully shaped so that there will be an advantageous triaxial state of stress as well as a high optimal closing contact pressure in the volume close to the weld during forging.
3. The parts are heated, preferably by direct high frequency resistive heating, so that the surface temperature is optimal for the material to be welded and so that the temperature gradient enhances a desirable mode of plastic deformation.
4. A reducing gas is passed between the surfaces of the parts to be welded so that oxides that are detrimental to the quality of the weld are removed before welding/fusion.

The advantages of the method of forge or enhanced diffusion welding described in the above-mentioned patents are the high speed at which welding may be performed. The entire welding cycle may last less than a minute for easily weldable steels. Furthermore, there is no need for expensive machining or other type of trimming of the part shapes after welding since the outer surfaces of the joined parts may be almost completely flush close to the weld. There is also a potential for a high degree of process control and documentation since the temperature is much more closely controlled than for conventional welding methods.

However, in order to establish a weld of uniform quality and shape it is important to exactly control the viscoplastic deformation of the material. The viscoplastic deformation is to a large extent controlled by the temperature distribution, which may deviate from the desired one in the directions normal to and along the bevel surfaces. Also the material properties may affect viscoplastic deformation and be a cause of variability, which must be detected and compensated for.

In order to secure the highest possible weld quality it is important to make certain that the temperature of the bevel surfaces is within a certain range. A too high temperature may cause undesirable melting or excessive grain growth while a too low temperature will unavoidably lead to insufficient reduction of surface oxides and poor bounding. Undesirable material phase shifts and brittleness may also be the result of poor temperature control during heating and cooling.

The heat input and the cooling time after welding are directly related for a given part geometry and material if no special measures are implemented. A large input of heat during the heating stage of the process will produce a heated zone of large extent and cause slow cooling of the material after welding. This may be a problem particularly when welding metals that must be quenched and tempered in order to establish sufficient ductility for a given strength.

Another problem arises during welding of alloys that require artificially slow cooling after joining. After the weld has been established it is not practical with existing high frequency resistive heating technology to apply a current directly in order to prevent a sharp temperature drop. This would only cause short-circuiting with the current running from one of the electrodes to the other electrode on the same side of the part.

Hence, with conventional forge welding methods and the standard high frequency resistive heating method, it may be difficult to control the temperature and to establish optimal thermal conditions for plastic deformation, fusion and metallurgical processing at all stages and for any given material and part geometry.

SUMMARY OF THE INVENTION

It is an object of the present invention to provide an apparatus and method for forge welding that improved temperature control of the articles being welded, to allow a better quality weld of certain metal alloys that are responsible to temperature treatments prior to or after the welding step.

Another object is to provide an apparatus that is easy and quick to operate.

This is achieved in an apparatus and method for forge welding in which the normal resistive heating method is complemented with one or more inductive heating steps. To facilitate quick shifts between the two heating methods, the inductive heating is performed with a segmented coil which is powered from the power supply powering the electrodes used for resistive heating.

The scope of the invention is defined in the appended claims.

BRIEF DESCRIPTION OF THE DRAWINGS

The invention will now be described in detail in reference to the appended drawings, in which.

DETAILED DESCRIPTION

Figure 1:
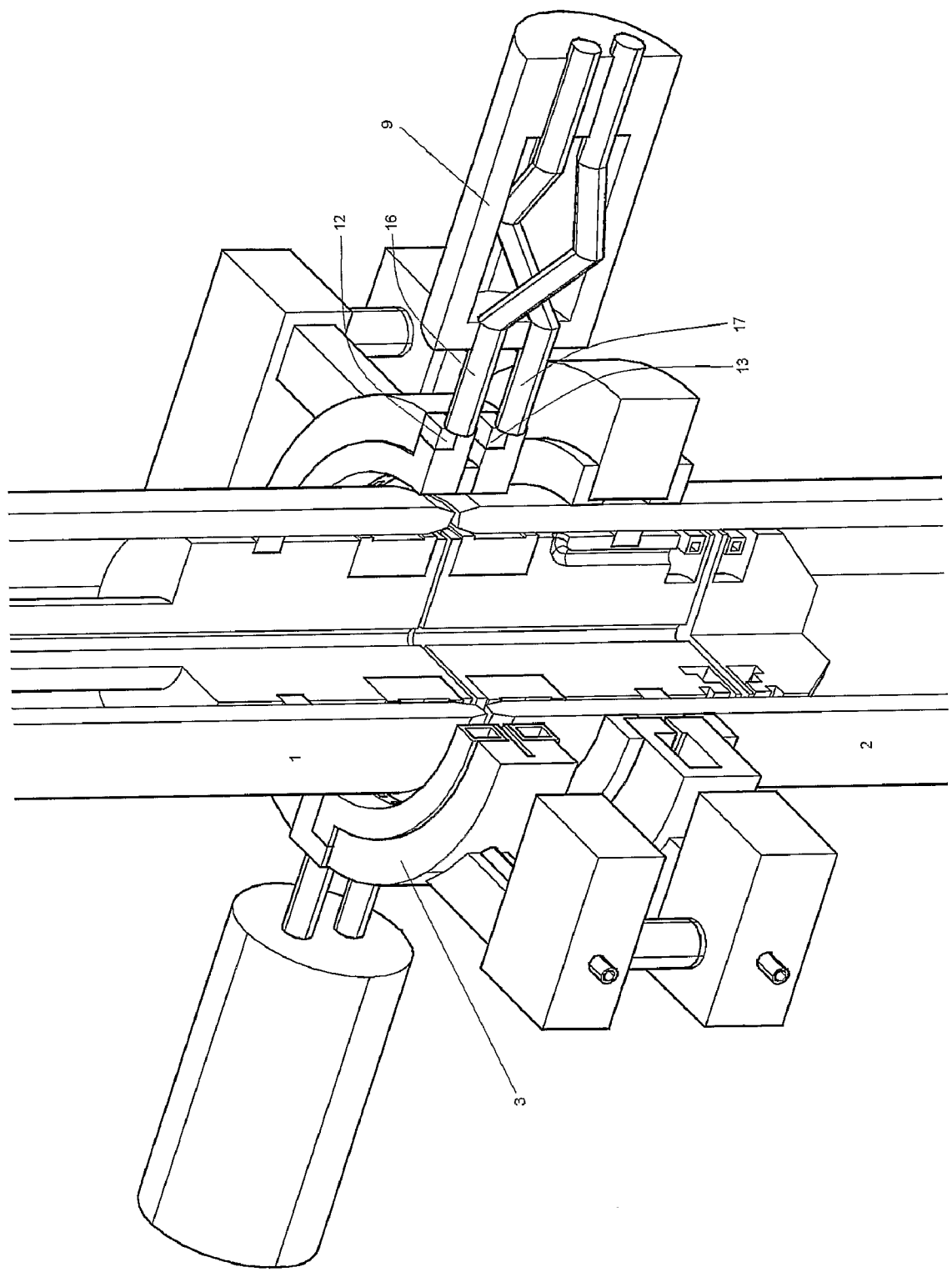
FIG. 1-4 shows a partly cutaway view of the inventive welding apparatus during a welding sequence.

The induction heating arrangement may be realized in at least two different embodiments:

1. A two-part coil that shares the transformer supplying the contact assemblies. This is illustrated in FIGS. 1-4. Here, the coil part 3a is equipped with contact pads 12, 13. During induction heating, the contact assembly 8 is pushed towards the contact pads 12, 13. The other contact assembly 9 is pushed towards corresponding contact pads on the other coil half 3b. It is a large benefit to avoid a dedicated transformer for feeding the coil, as this component is very bulky and takes up a lot of room. It is also expensive.
2. A four-part coil supplied with current from the transformer(s) supplying the contact assemblies, in which coil segments are fastened to the tips of the contacts. In this case, contact gaps 14, 15 are arranged in the coil. The contact gaps are closed before current is applied. This embodiment is illustrated in FIG. 5.

FIG. 1-4 illustrates a welding sequence showing an embodiment of the inventive welding apparatus in detail. In the illustrated embodiment, a two-part coil is employed, as well as a separate cooling ring. The cooling ring 18 includes a central chamber 19 with a is number of apertures or nozzles 20 in the inner wall. Packings 21, 22 are proved at the upper and lower part of the cooling ring, respectively, for restricting the area affected by the cooling fluid ejected through the apertures 20.

In FIG. 1, a two-part coil 3 has been positioned outside the gap between two tube sections 1, 2. The figure shows that contacts 16, 17 in contact assembly 9 are being pushed against the contact pads 12, 13. Thus, the coil circuit is completed through the contact assemblies. Power is supplied through the contacts, and the tube sections are heated inductively.

Figure 2:
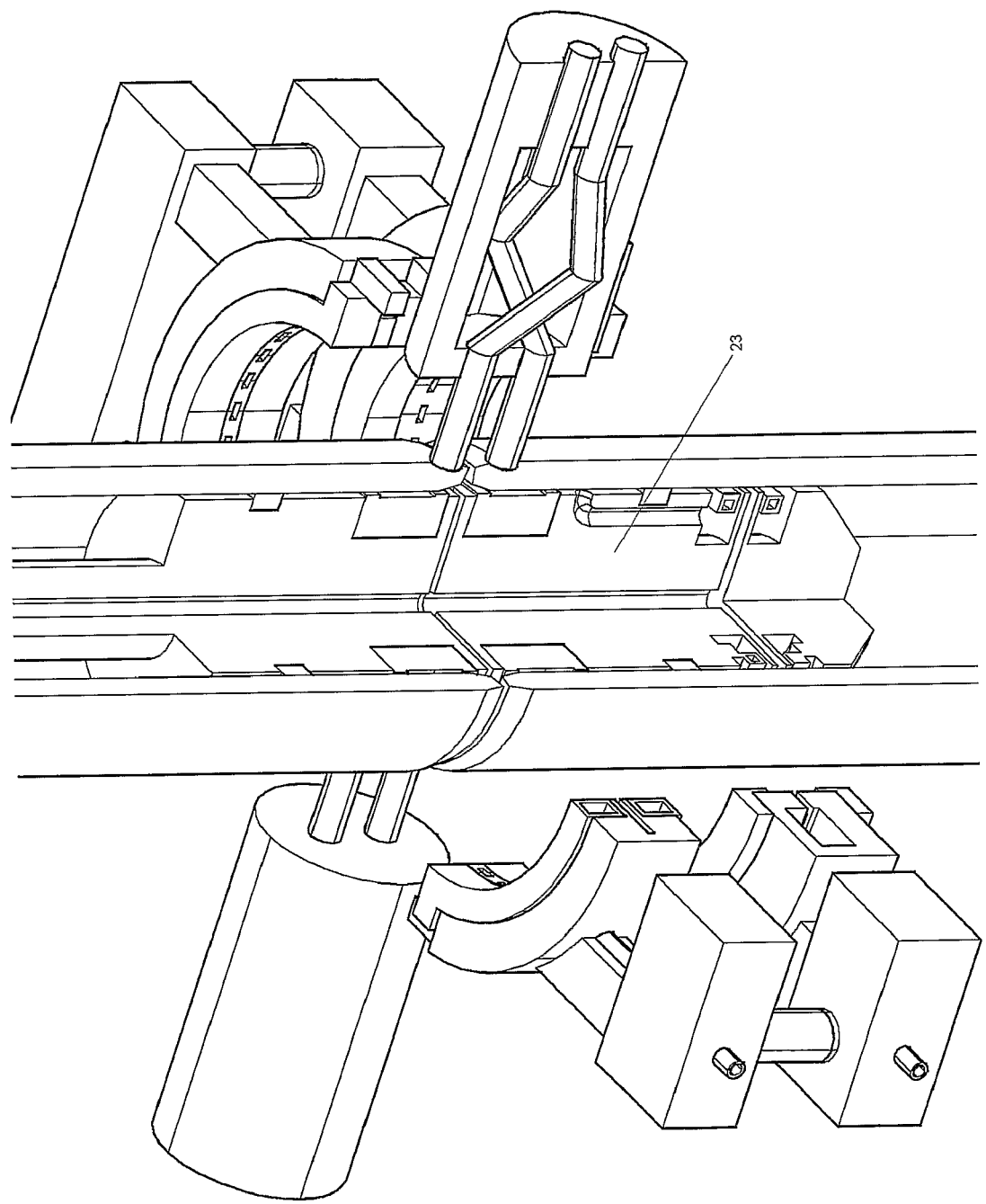

In FIG. 2, power has been removed and the coil sections have been retracted in a radial direction by positioning devices (not shown). Then, the contacts in the contact assemblies have been pushed onto the tube sections. Power has been applied again; this time creating a localized heating of the tube ends by resistance heating. A stinger 23 on the inside of the tubes supplies a flushing fluid through the gap between the tube ends. The flushing fluid works in particular to prevent oxides from forming and for reducing oxides on the tube ends.

Figure 3:
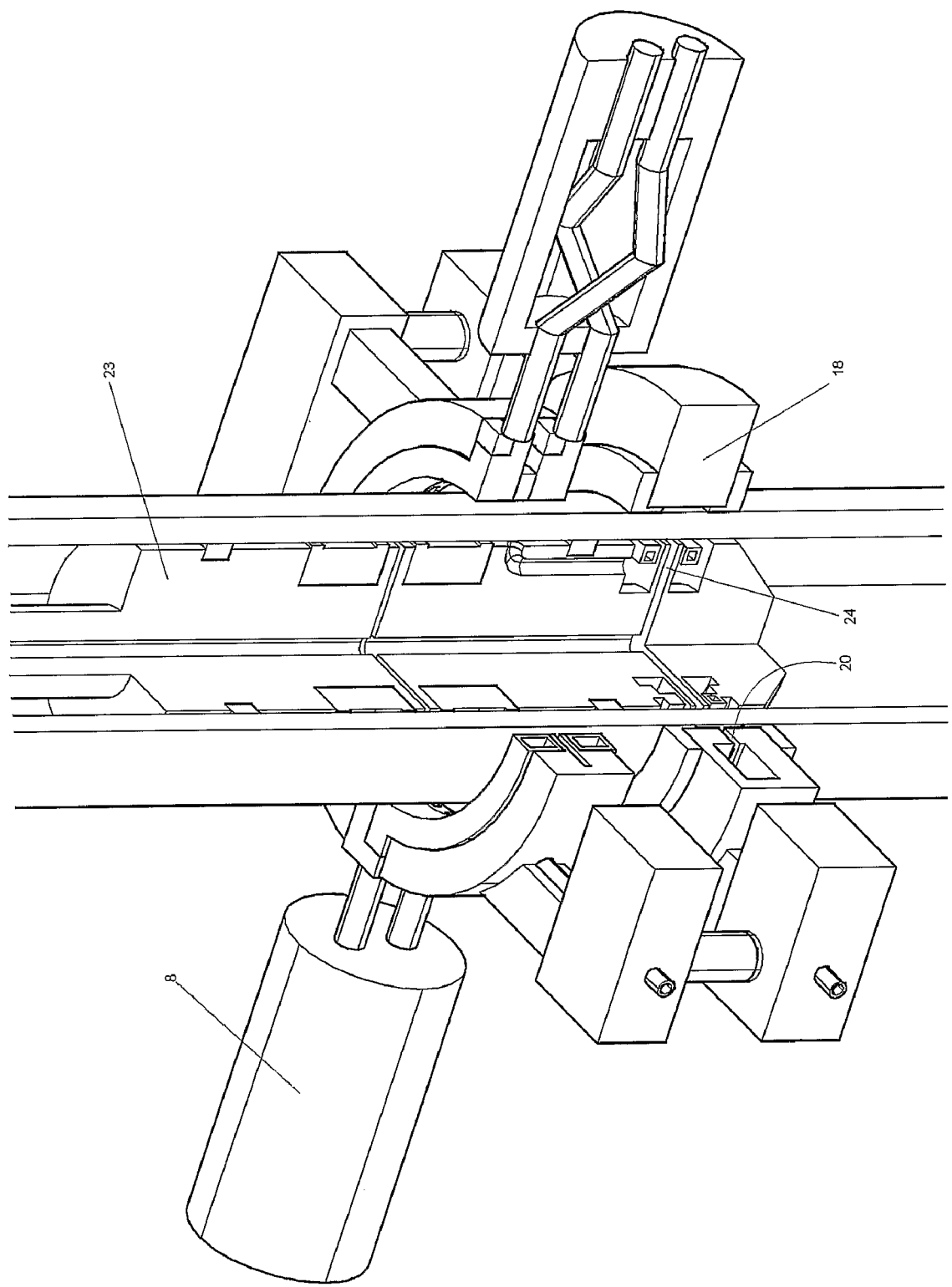

In FIG. 3, the contact assemblies 8, 9 have been retracted and the hot tubes forced together. Then, the welding per se is completed. Actuators have positioned the cooling ring 18 outside the welding seam, and a cooling fluid is supplied through the apertures 20 for quench cooling the area around the welding seam. The stinger 23 has been relocated inside the tube to bring apertures 24 in proximity of the welding seam. The apertures 24 are supplying a cooling fluid from a channel inside the stinger, and are adapted to cool the tube from the inside. It is also possible not to move the stinger before cooling and to merely use the apertures for the reducing gas to apply the cooling gas internally.

Figure 4:
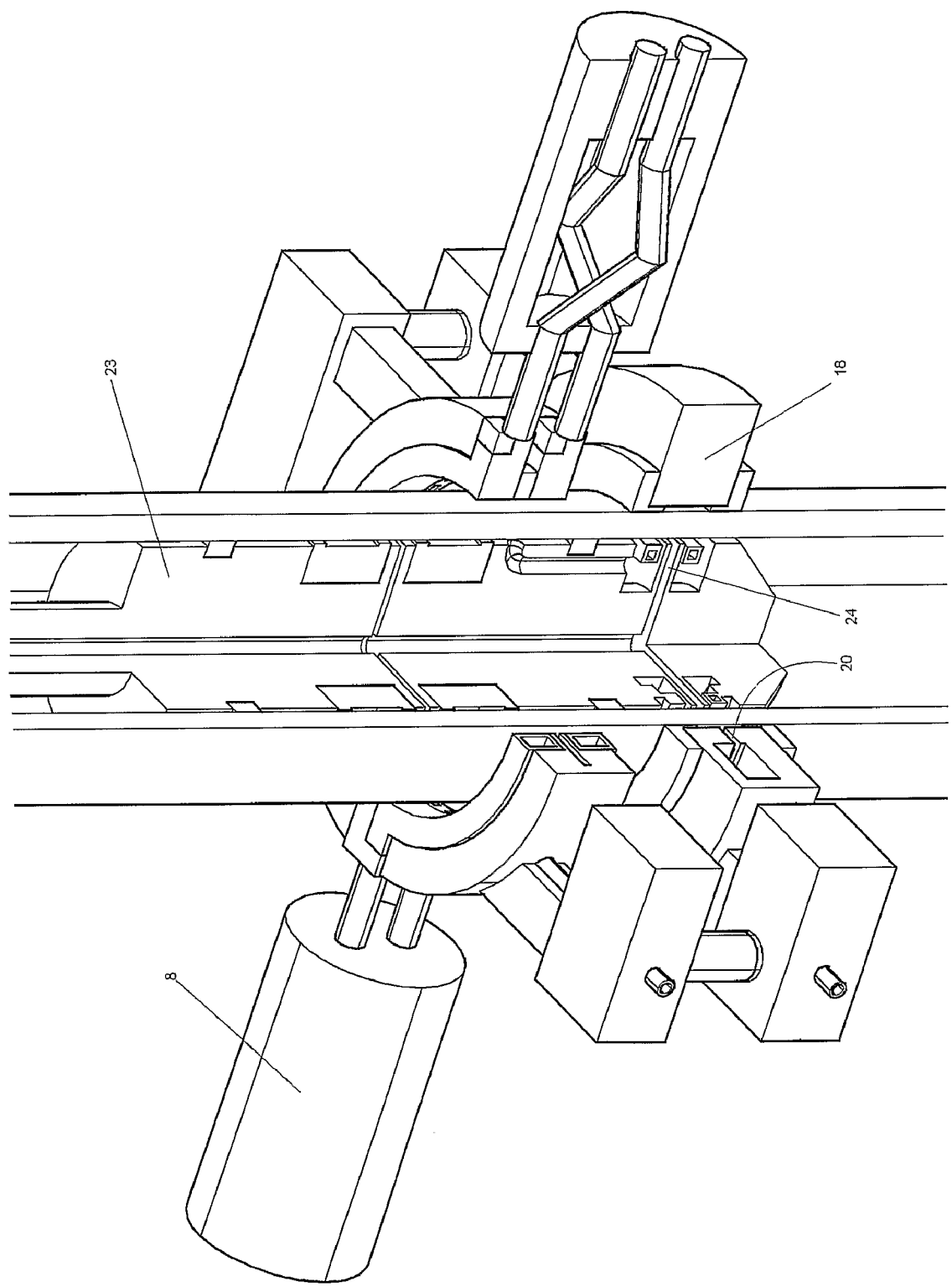
Figure 5:
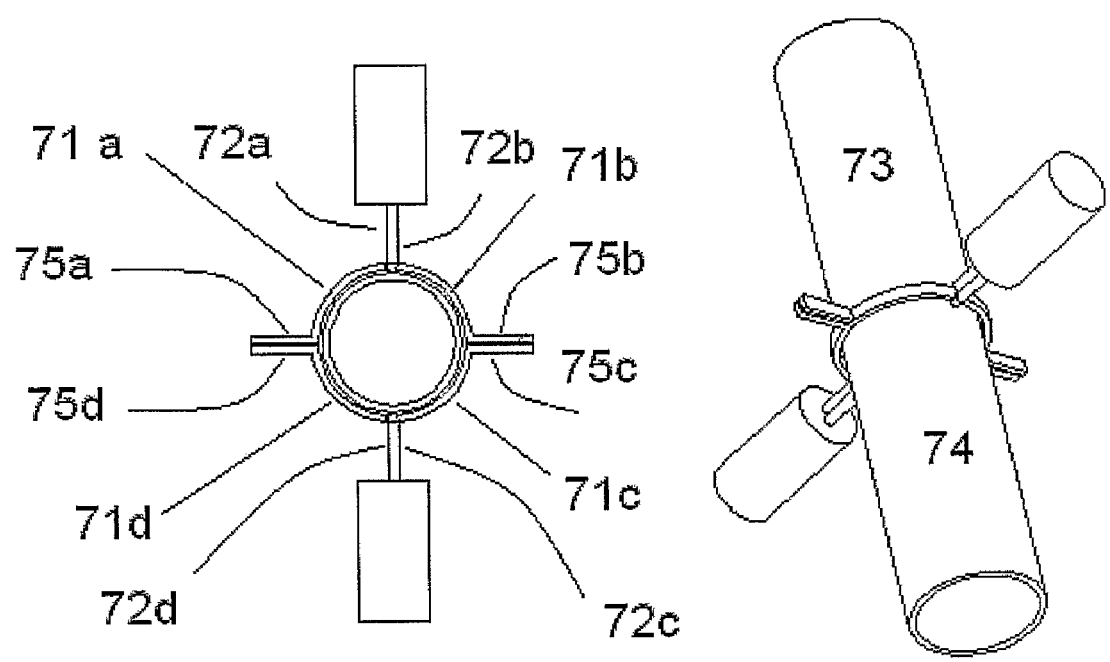
FIG. 5 illustrates another embodiment of the invention, FIGS. 6a and b is a schematic diagram of a possible electric circuit for powering the inventive welding apparatus.

In FIG. 4, the induction coil 3 has been positioned outside the welding seam for an after welding heat treatment of the tube. Also the stinger 23 has been moved to position an induction coil 25 near the welding seam. Thus, the welding seam and the adjacent area are heated both from the inside and outside of the tube. The thickness of the pipe and the characteristics of the material determines whether it is necessary to use an internal coil in addition to an external.

The invention enables heat treatment of the metal prior to welding or immediately after welding as an integrated part of the process. The heat treatment may include reduced cooling rate for normalizing the metal, or annealing subsequent to welding and quenching. These steps may be necessary or not dependent on the properties of the metal used in the tubes, as explained earlier.

For some material qualities pre-heating with induction coils give a temperature distribution (more widely distributed) that is better suited for slow plastic deformation and establishment of microstructure with small grains. The improved temperature distribution includes a more even distribution along the periphery of the tubes.

In embodiments of the inventive apparatus that includes a stinger positioned on the inside of the tubes, a temperature gradient between the inside and the outside of the tubes may be achieved, which is beneficial for the welding of bi-metal tubes.

The induction coil may also be used for drying the articles prior to welding.

The combined use of induction and resistive heating has a synergic effect. Resistive heating enables quick heating and forging with a narrow temperature field, i.e. a temperature field with a steep thermal gradient. Inductive heating achieves a more widely distributed temperature field and is suited for pre-heating and heat treatment. By using an apparatus that quickly (0.5-2 seconds) shifts between inductive and resistive heating, it is possible to weld and heat treat tubes in succession, and join tubes that earlier could not be welded in a short time. Then it is necessary that the apparatus includes cooling means for quenching. Earlier processes were very time-consuming, and were not feasible to adopt in a single welding apparatus.

In addition to pre-heating, normalizing and annealing steps, the tubes may be induction heated during the forging step when the tubes are brought together. This heating may be performed with coils both inside and outside the tubes. Subsequently, the tubes may be cooled in a way that is optimal for the metal in question. The cooling step may include cooling in air, rapid quenching by applying gas or liquid through an array of nozzles, or reduced rate cooling with simultaneous inductive cooling with reduced effect. In case annealing is required, this is done by induction heating to the proper temperature (e.g. 680-700° C.). If a full cycle with heat treatment is required, the tubes are induction heated before the material is quenched and annealed.

FIG. 5 shows another embodiment of the invention. Here, the coil is divided into four segments, 71a-d. Each segment is mounted at the tip of a respective electrode 72a-d. A small point protrudes on the inside of each coil segment, and during resistive heating, these points are pressed against the tubes 73, 74. For inductive heating, the coil segments are retracted a small distance to break the contact between the points and the pipe walls. Then, shorting devices (not shown) are adapted to short the coil segments at protruding parts 75a-d. The shorting devices may be solenoids pressing the protruding parts together, or solenoid operated shorting bars adapted to close the gap between the protruding parts 75a-d.

Figure 6A:
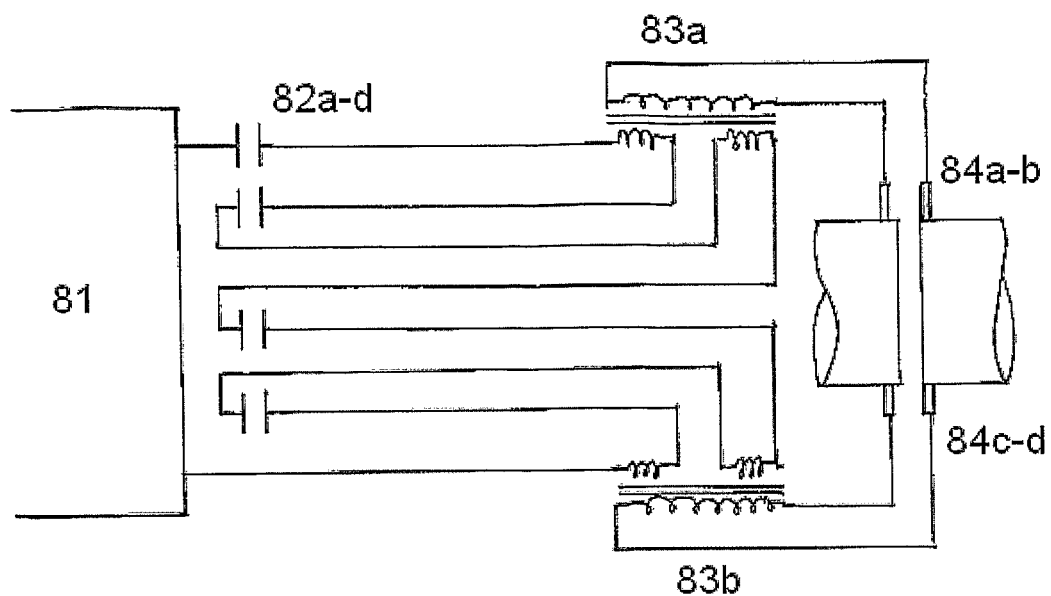
Figure 6B:
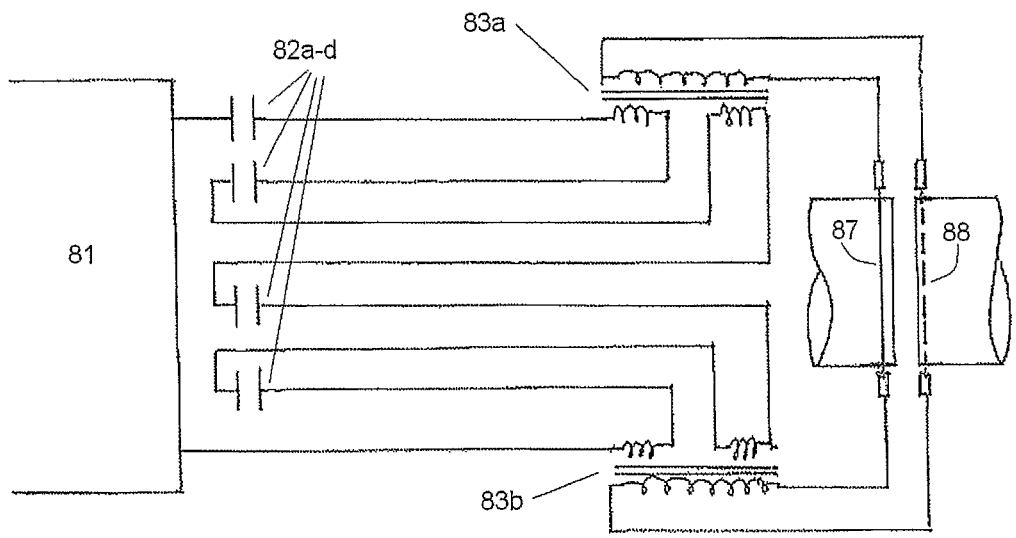

FIG. 6a-b illustrates a possible circuit for powering the inventive devices, and in particular the embodiment of the invention illustrated in FIGS. 1-4. A high frequency generator 81 feeds two field transformers 83a-b. Each field transformer 83a-b includes two primary windings, which are connected in series through capacitors 82a-d. FIG. 6a shows the circuit during resistive heating, when contacts or electrodes 84a-d are pressed against the tube walls. The contacts are connected with secondary windings of the transformers, and leads current through the pipe walls.

In FIG. 6b the contacts has been retracted from the tube walls and instead connected with two coil segments 87, 88 to complete the circuit. The pipe segment 87 is on the visible side of the tubes, while the segment 88 (shown in broken line) is on the other side of the tubes. Several more contacts and coil segments may also be used to sequentially heat the tubes in segments of their circumferences.

The invention claimed is:

1. An apparatus for forge and diffusion welding a first elongate article to a second elongate article, said apparatus including:
   a first contact assembly including a first pair of electrodes,
   a second contact assembly including a second pair of electrodes,
   said contact assemblies including first and second contact positioning devices adapted to position and hold said electrodes onto said articles in a first position for resistive heating,
   a power supply adapted to supply electric current to the contact assemblies,
   an induction coil surrounding the elongate articles including:
      a first coil segment mounted on a first coil positioning device, said first coil positioning device being adapted to position the first coil segment in a radial direction in relation to said articles,
      a second coil segment mounted on a second coil positioning device, said second coil positioning device being adapted to position the second coil segment in a radial direction in relation to said articles,
      wherein the first coil segment includes first and second contact pads, the second coil segment includes third and fourth contact pads, said first and second contact positioning devices being adapted to establish electrical contact between said contact pads and said first and second pairs of electrodes in a second position.

2. An apparatus for forge and diffusion welding a first elongate article to a second elongate article, said apparatus including:
   a first contact assembly including first and second electrodes,
   a second contact assembly including third and fourth electrodes,
   said contact assemblies including first and second contact positioning devices adapted to position and hold said contact assemblies,
   a power supply adapted to supply electric current to the contact assemblies,
   an induction coil surrounding the elongate articles including:
      a first coil segment mounted on the first electrode,
      a second coil segment mounted on the second electrode,
      a third coil segment mounted on the third electrode,
      a fourth coil segment mounted on the fourth electrode,
      a contact point protruding on the inside of each coil segment adapted to contact the elongated articles during resistive heating,
      shorting devices adapted to short the coil segments at protruding parts.

3. A method of forge welding a first elongate article to a second elongate article, said method including:
   positioning said elongate articles end-to-end with a narrow gap separating the articles,
   welding the articles to each other by applying electrical contacts on the articles,
   providing a high-frequency electrical current between the contacts and resistive heating the articles,
   forging the articles together,
   heating the articles with an induction coil surrounding the elongate articles, either immediately before, before and after, or only after said welding step, or during said forging step, wherein the induction heating step includes retracting the contacts from the articles, applying the contacts to contact pads provided on the induction coil, and supplying current to the induction coil from the contacts.

4. A method for forge welding a first elongate article to a second elongate article, said method including:
   positioning said elongate articles end-to-end with a narrow gap separating the articles,
   welding the articles to each other by holding contacts points onto the articles and providing a high-frequency electrical current between the contact points heating the articles,
   forging the articles together,
   heating the articles with an induction coil surrounding the elongate articles, either immediately before, before and after, or only after said welding step, or during said forging step, wherein the induction heating step includes retracting the contact points from the articles, shorting coil segments to form a continuous coil, and supplying current to the induction coil.

* * * * *